United States Patent [19]
Woo

[11] Patent Number: 5,754,115
[45] Date of Patent: May 19, 1998

[54] IMPACT SENSING SYSTEM

[76] Inventor: Jin Ho Woo, 209-507 Hyundai Apt., 311-126, Sankok-3-Dong, Bupyung-Gu, Incheon-City, Rep. of Korea

[21] Appl. No.: 656,917

[22] Filed: Jun. 3, 1996

[51] Int. Cl.$^6$ ................................................ G08B 13/22
[52] U.S. Cl. .................. 340/665; 73/650; 73/654; 73/658; 340/429; 340/566; 340/669
[58] Field of Search .................................... 340/665, 669, 340/566, 429; 73/654, 650, 658

[56] References Cited

U.S. PATENT DOCUMENTS

| | | | |
|---|---|---|---|
| 4,028,659 | 6/1977 | Rihn | 340/566 |
| 4,584,569 | 4/1986 | Lopez | 340/566 |
| 5,459,447 | 10/1995 | Snyder et al. | 340/566 |

*Primary Examiner*—Glen Swann
*Attorney, Agent, or Firm*—Ladas & Parry

[57] ABSTRACT

An impact sensing system senses an impact or acceleration applied and provides an external alarm indicative of the impact or acceleration applied. An envelope detector detects an envelope of an output signal of said sensor unit. An amplifier amplifies the output signal of said envelope detector, a direct current component being eliminated therefrom. A first low pass filter filters a first level signal from the output signal of said amplifier, the first level signal being indicative of a first level of impact or acceleration. A second low pass filter filters a second level signal from the output signal of said amplifier, the second level signal being indicative of a second level of impact or acceleration. A first timing pulse generator generates a first timing pulse with a first time duration in response to the output signal of said first low pass filter, the first time duration being indicative of said first level signal. A second timing pulse generator generates a second timing pulse with a second time duration in response to the output of said second low pass filter, the second time duration being indicative of said second level signal. An alarm drive circuit drives an external alarm in response to the first timing pulse and the second timing pulse. A power supply is coupled to said envelope detector, said amplifier, said first timing pulse generator, said second timing pulse generator and said alarm drive circuit for supplying a stable electric power source.

3 Claims, 2 Drawing Sheets

IMPACT SENSING SYSTEM

TECHNICAL BACKGROUND

The present invention concerns an impact sensing system installed in a vehicle, house, etc. to protect them from being stolen by means of detecting an impact or acceleration applied.

Conventionally there have been proposed various kinds of impact sensing systems, which for example include a ball-spring contact type with a ball inserted between two contact points, magnetic inductance type, photo sensor type using a reflected laser beam, etc. Among them the magnetic inductance type is commercially most available occupying at least 80% of the market.

A typical magnetic inductance type impact sensing system is U.S. Pat. No. 4,584,569, where a magnet is used as a weight mass suspended in the center of a resilient cord so as to face a pickup coil. When the magnet moves, an electrical signal is induced in the coil processed by a combined circuit of a time delay circuit and a comparator to generate an output signal used to measure an acceleration, abrupt motion or impact. Namely, the induced electrical signal is firstly detected by a signal limitation circuit applied to a comparator to generate a given voltage. Then the signal is applied to a first delay circuit and to a comparator. The output of the comparator is applied to a second delay circuit, and also applied to another comparator as a voltage signal with a given delay time. The another comparator generates an output signal according to the signals of an audible frequency generator, which is applied to an alarm drive circuit to produce an alarm signal.

This patent features a first and a second delay circuit connected in series so as to continue generation of the alarm signal for a given time even if the movement of the magnet is made for a short time. Hence, the impact sensing system works smart even against a slight impact, thus securing protection against stealing. However, such impact sensing system often erroneously works in response to the magnetic inductance of the coil caused by the relatively strong output signals of a radio transmitter used in a high speed patrol car, hand phone, etc., or a natural phenomenon such as lightning.

SUMMARY OF THE INVENTION

It is an object of the present invention to provide a reliable impact sensing system installed in a vehicle or house, which correctly generates a warning signal by detecting an impact or acceleration caused by an unexpected attack such as stealing.

It is another object of the present invention to provide an impact sensing system, wherein the LC oscillator comprises a coil loop moving relative to a magnetic core to produce signals having two kinds of pulse widths.

It is still another object of the present invention to provide an impact sensing system, wherein the envelope of the pulses of an LC oscillator is detected passing through a low or high pass filter to a timing pulse generator consisting of a half-wave rectifier having a given pulse width so as to prevent the system from erroneous working.

According to an embodiment of the present invention, an impact sensing system comprises a sensor unit for sensing an impact or acceleration applied, a envelope detector for detecting the envelope of the output signal of the sensor unit, an amplifier for amplifying the output signal of the envelope detector with eliminating the direct current component therefrom, a first low pass filter for filtering a low level signal from the output signal of the amplifier, a second low pass filter for filtering a high level signal from the output signal of the amplifier, a first timing pulse generator for generating a first timing pulse with a given amplitude in response to the output signal of the first low pass filter, a second timing pulse generator for generating a second timing pulse with a given amplitude in response to the output of the second low pass filter, an alarm drive circuit for driving an external alarm according to the pulse signals of the timing pulse generators, and a power supply for supplying a stable electric power.

In one aspect of the present invention, an impact exerted to the impact sensing system causes a coil loop to move relative to a ferro-magnetic core making an abrupt change in the inductance value of the coil, which changes the frequency and amplitude of the LC resonant oscillation so as to prevent the coil from being energized by an irrelevant signal.

In another aspect of the present invention, the magnitude of an externally exerted impact is determined by means of at least a low pass filter, according to which a low and a high level signal are applied to the half-wave rectifier. Hence, the system detects not only a weak impact, but also limits a strong impact so as to reduce the effect of an irrelevant strong signal, thus preventing the system from erroneous working.

The present invention will now be described more specifically with reference to the drawings attached only by way of example.

BRIEF DESCRIPTION OF THE ATTACHED DRAWINGS

DETAILED DESCRIPTION OF PREFERRED EMBODIMENTS

Figure 1A:
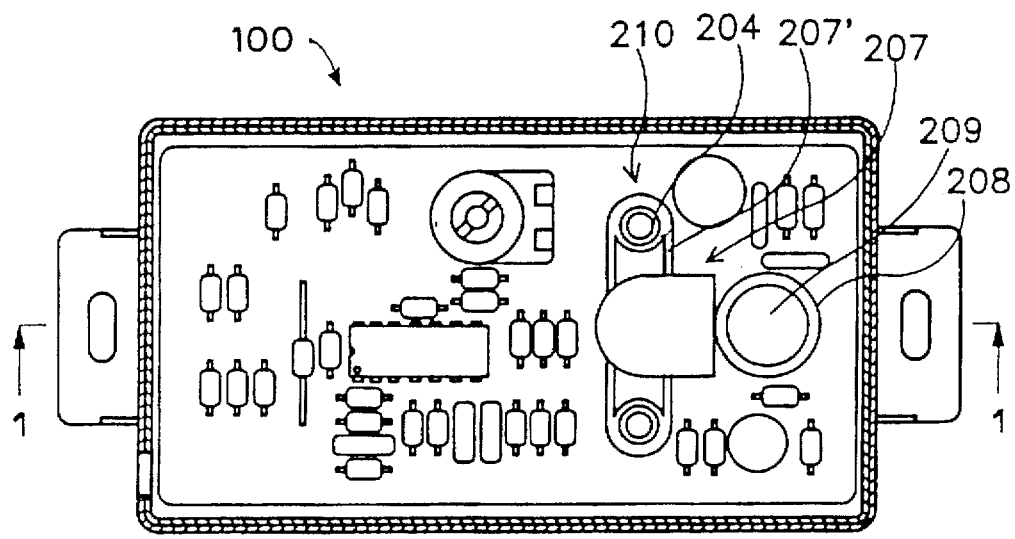
FIG. 1A is a plane view of a printed circuit board having the inventive impact sensing system, which is mounted in a housing.
Figure 1B:
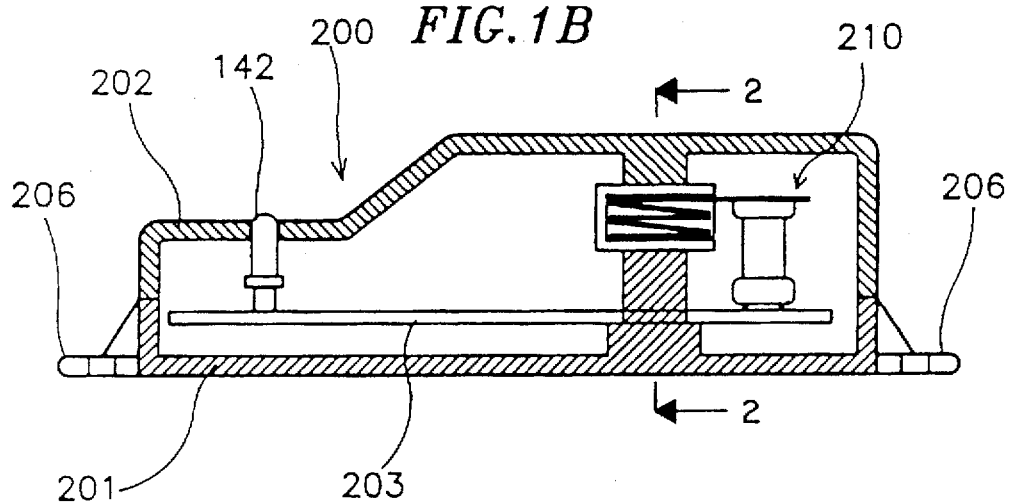
FIG. 1B is a cross sectional view taken along line 1—1 of FIG. 1A.
Figure 1C:
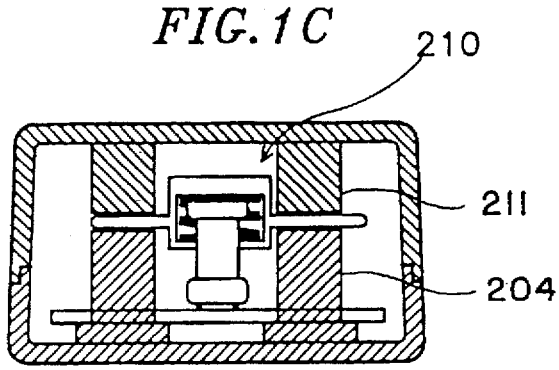
FIG. 1C is a cross sectional view taken along ling 2—2 of FIG. 1B.

Referring to FIGS. 1A, 1B and 1C, the inventive impact sensing system 100 includes a printed circuit board 203 and a sensor unit 210 mounted in a housing 200, which consists of a lower part 201 for fixedly attaching the printed circuit board 203 and an upper part 202 mounted on the lower part 201. The lower part 201 includes fastening extensions 206 formed at two opposite sides.

The printed circuit board 203 is provided with all the electronic components necessary for the impact sensing system, supported on the lower part 201 by means of a pair of projections 204 formed with a proper space between them. The sensor unit 210 has a weight mass 207 vibrated by an external impact or acceleration, which may be made of a rubber or non-insulating material to have a given weight. The weight mass 207 has one side opened with the remaining sides sealingly closed, enclosing a coil wound at a given number with a loop 208 externally extended from the top thereof. The weight mass 207 includes a pair of resilient blades 207' respectively suspended by the projections 204 at the outer end portions, so that it may be vibrated upwardly and downwardly in response to an impact.

Also included in the sensor unit 210 is a ferro-magnetic core 209 fixedly attached to the printed circuit board 203 facing the weight mass 207. The core 209 is bobbin-shaped, along whose outer periphery moves upwardly and downwardly the loop 208 according to the vibration of the weight mass 207. Thus the sensor unit 210 may generate a current by the inductance caused by the relative movement of the loop 208 with the core 209.

The upper part 202 of the housing enclosing the printed circuit board 203 has an opening for protruding a light emitting diode 142, and a pair of downward projections 211 to respectively face the projections 204 of the lower part 201. The projections 211 may have threaded holes so as to connect the upper and lower parts 202 and 201 by means of screws.

Figure 2:
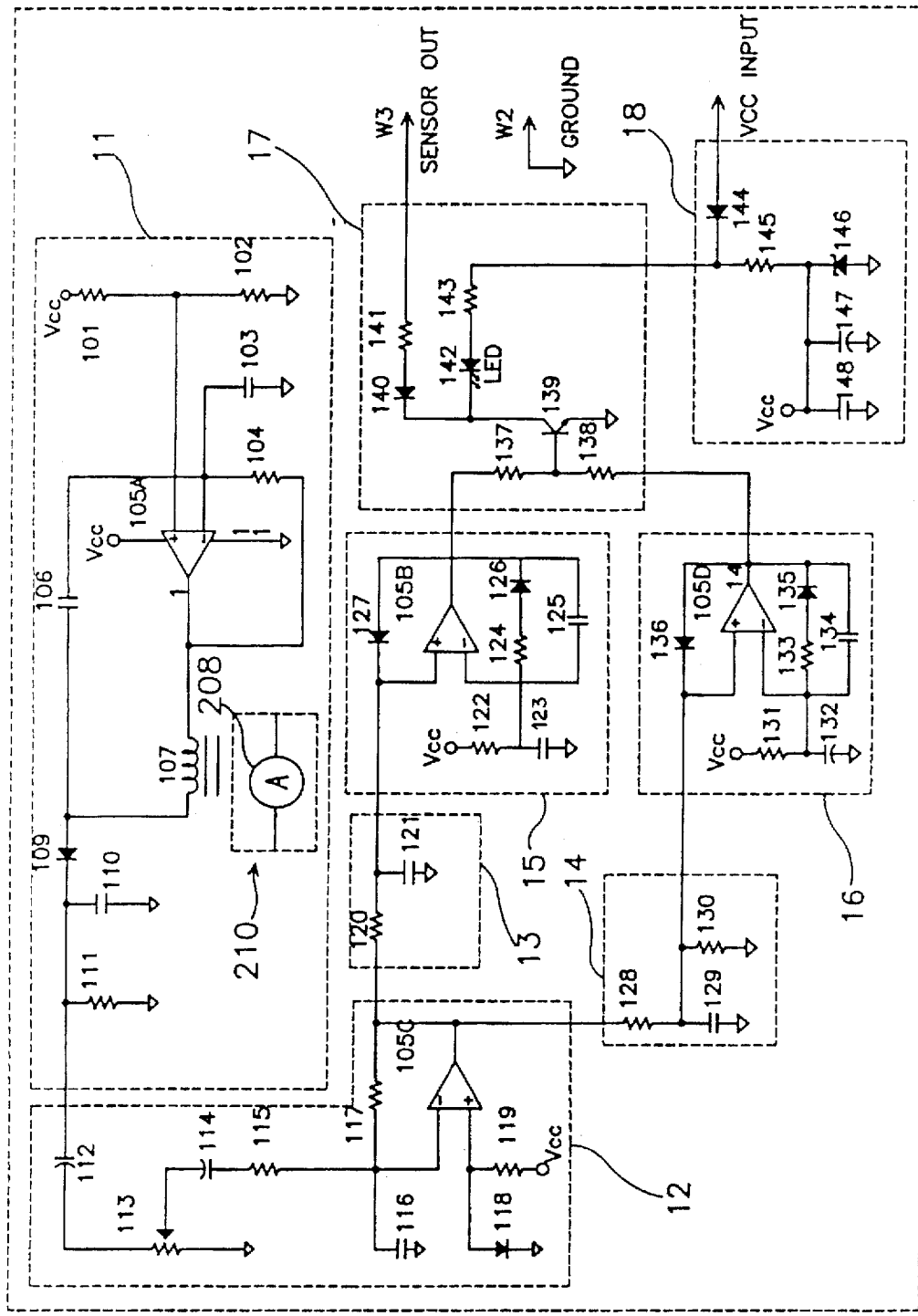
FIG. 2 is a circuit diagram for specifically illustrating the principle of the inventive impact sensing system.

Mounted on the printed circuit board 203 are the electronic components necessary for making the inventive impact sensing system, as shown in FIG. 2. Namely, an envelope detector 11 includes the sensor unit 210, which has the coil 107 associated with the loop 208. The coil 107 has one end connected with the output terminal of an operational amplifier 105A and the other end through a capacitor with the inverting terminal. At the same time, the inverting terminal is also connected with a resistor 104 and a capacitor 103, whereby a frequency of about 40 KHz is generated $$\left(f_o = \frac{1}{2\pi \sqrt{L107 \times C106//C103}}\right)$$

wherein $L_{107}$ represents the inductance of coil 107, $C_{106}$ represents the capacitance of capacitor 106, and $C_{103}$ represents the capacitance of capacitor 103. The non-inverting terminal of the operational amplifier 105A is applied with a reference voltage biased by resistors 101 and 102. The output signal is fed back through the resistor 104 to the inverting terminal so as to stabilize the frequency generation. The output signal is applied to the envelope detector consisting of a diode 109, capacitor 110 and resistor 111.

The envelope detector 11 generates an electrical signal by means of the operational amplifier 105A and the associated elements according to the coupling coefficient of the coil and the loop as the loop 208 is accelerated upon exerting an impact, detecting the envelope of the pulses abruptly changing according to the oscillation frequency, so that the oscillation frequency signal may have a pulse width according to the time constant of the resistor 111 and the capacitor 110.

The detected signal is applied to an amplifying circuit 12, which includes an operational amplifier 105C with the inverting terminal connected to a direct current preventing capacitor 112, a variable resistor 113, a capacitor 114, a resistor 115 and a grounded capacitor 116, and the output terminal fed back through a resistor 117 to the inverting terminal. The non-inverting terminal is connected with a grounded diode 118 and a current source resistor 119 connected in parallel.

Hence, the signal applied to the inverting terminal of the operational amplifier 105C is deprived of the direct current component by the capacitor 112, adjusted by the variable resistor 113, filtered by the resistor 115 and the capacitor 116. The detected signal is amplified according to the amplifying capacity determined by the diode 118 and the resistor 119 applied to the first and second low pass filters 13 and 14.

The first low pass filter 13 consists of a resistor 120 and a capacitor 121. The second low pass filter 14 consists of a resistor 128 connected in series with a capacitor 129 and a resistor 130 connected in parallel with the capacitor 129. The output signal of the amplifying circuit 12 is divided by the first and the second filter 13 and 14 into two signals, i.e., weak impulse signal (low level) and strong impulse signal (high level), whose cut-off frequencies are respectively $$F_{CL} = \frac{1}{2\pi(R120 \times C121)} \text{ and } F_{CH} = \frac{1}{2\pi(R128 \times C129)}$$

wherein $R_{120}$ represents the resistance of resistor 120, $C_{121}$ represents the capacitance of capacitor 121, and $R_{128}$ represents the resistance of resistor 128, $C_{129}$ represents the capacitance of capacitor 129.

The signals passing the first and the second filters 13 and 14 are respectively applied to the first and the second timing pulse generator 15 and 16 respectively provided with operational amplifiers 105B and 105D. The operational amplifier 105B has a non-inverting terminal fed back by a detecting diode 127 and an inverting terminal fed back by a resistor 124 connected in series with a detecting diode 126. The inverting terminal is also connected with a resistor 122 and a capacitor 123 having a given time constant $$(T_L = R122 \times C123)$$

wherein $R_{122}$ represents the resistance of resistor 122, and $C_{123}$ represents the capacitance of capacitor 123. Thus the first timing pulse generator 15 is obtained by the operational amplifier 105B constituting a half-wave rectifier.

Likewise, the operational amplifier 105D has the non-inverting terminal fed back by a detecting diode 136 and the inverting terminal fed back by a resistor 133 connected in series with a detecting diode 135. The inverting terminal is also connected with a resistor 131 and a capacitor 132 having a given time constant ($T_H = R_{131} \times C_{132}$) wherein $R_{131}$ represents the resistance of resistor 131, and $C_{132}$ represents the capacitance of capacitor 132. Thus the second timing pulse generator 16 is obtained by the operational amplifier 105D.

In addition, a capacitor 125 is connected in parallel with the resistor 124 and the diode 126 while a capacitor 134 is connected in parallel with the resistor 133 and the diode 135. These capacitors 125 and 134 serve to bypass radio frequency signals (RF signals) in order to prevent erroneous operations due to variations of the bias voltages caused by possible direct currents induced across the diodes. In this way, the low level signal is applied to the non-inverting terminal of the operational amplifier 105B half-wave rectified while the high level signal is applied to the non-inverting terminal of the operational amplifier 105D half-wave rectified.

Thus, the timing pulses rectified through the first and the second timing pulse generators 15 and 16 to have given time constants are applied through resistors 137 and 138 to an external device drive circuit 17, which includes a transistor 139 with the base connected to the connecting point between two resistors 137 and 138, the emitter grounded and the collector connected through a diode 140 and a resistor 141 to an output terminal W3 and through a light emitting diode 142 and a resistor 143 to a power supply. The external device may be a warning buzzer such as alarm.

The power supply 18 consists of a power stabilizer. The power input terminal is connected with a diode 144, which in turn is connected with a static voltage circuit, which consists of a zener diode 146, charging capacitor 147 and capacitor 148 connected in parallel with one another. Hence, the power supply has a stabilized voltage Vcc applied to the system.

When there is no external impact, the operational amplifier 105B of the first timing pulse generator 15 and the operational amplifier 105D of the second timing pulse generator 16 are respectively applied with the bias voltage formed by the resistors 122 and 124 and the diode 126 and the bias voltage formed by the resistors 131 and 133 and the diode 135 through their respective inverting terminals. Hence, the operational amplifiers 105B and 105D produce low level signals so as to not drive the transistor 139.

On the other hand, when there is an impact exerted on the system, the operational amplifier 105B generates a signal pulse having a different level from that of the operational amplifier 105D since they have passed respectively the low pass filter 13 of low level and the low pass filter 14 of high level. Namely, the operational amplifiers 105B and 105D should have respectively the triggering input levels $V_{LT}$ and $V_{HT}$ for the non-inverting terminals formulated as follows:

$$V_{LT} = \frac{R124 + R126}{R122 + R124 + R126} \times V_{CC},$$

$$V_{RT} = \frac{R133 + R135}{R131 + 133 + R135} \times V_{CC}$$

wherein $R_{124}$ represents the resistance of resistor 124, $D_{126}$ represents the resistance of diode 126, $R_{122}$ represents the resistance of resistor 122, $R_{133}$ represents the resistance of resistor 133, $R_{135}$ represents the resistance of diode 135, $R_{131}$ represents the resistance of resistor 131.

Designating the signal inputted to the first and the second low pass filters 13 and 14 by reference symbol Vin when the system has received an impact, the first and the second timing pulse generator 15 and 16 generate output signals of given pulse widths as described below.

If $V_{HT} > Vin > V_{LT}$, the first timing pulse generator 15 only generates pulses of amplitude $T_L$ for a given time. If $Vin > V_{HT} > V_{LT}$, the first timing-pulse generator 15 generates pulses of amplitude $T_L$ for a different given time, which are applied through the resistors 137 and 138 to the transistor 139.

Since electromagnetic wave interference occurs when a signal flowing in the coil 107 is directly amplified, a strong oscillator voltage is generated by using 105A, 107 and 106, a current flowing in the coil 107 is induced to the component 208 (where, the current cannot be induced to the component 208 if there is no oscillator voltage). 208 is a shorting loop coil. If a distance between 107 and 208 is short, 208's induction loss current increases so that the 107's impedance value becomes "LOW". If the distance between 107 and 208 is long, 208's induction loss current is reduced so that the 107's impedance value becomes "HIGH". If there is no 208 or the loop coil is opened, the voltage wave cannot occur. The amplifier 105C amplifies a detector signal of a capacitor 112.

Amplifier 105B is identical with that of another amplifier 105D. However, one of the output signals of the amplifier 105C is directly provided to the amplifier 105B, the other one of the output signals of the amplifier 105C, being attenuated through a resistor 128 (e.g., by −10 db), is applied to the amplifier 105D. That is, when the amplifier 105C outputs a signal whose level is higher than the output signal level (to be a triggering-in toward 105B) of the amplifier 105C by 10 dB, the amplifier 105D becomes a triggering-in state. Accordingly, the level at the time the amplifier 105D becomes "ON" state is defined as a "HIGH LEVEL". Also, the difference between the high level and the low level in the output signals of 105C can be over 10 dB.

If a strong shock is applied to sensor according to the present invention, a variable range of 208 is broad so that ranges of 107 and 208 are largely varied. If a weak shock is applied to the present invention, a variable range of 208 is narrow so that ranges of 107 and 208 are varied a little. As a result, a detector output is generated as a level signal, a high level signal being indicative of a strong shock, and a low level signal being indicative of a weak shock.

If the shock is applied to 208, a damping occurs because 208 is included in a silicon rubber of 210. Accordingly, a damping wave occurs in an electrical output. As a result, a strong shock damping wave and a weak shock damping wave are distinguished from each other. Accordingly, low pass filters are provided.

The timing pulses of $V_{LT}$ and $V_{HT}$ are different from each other. If there is no shock, $V_{LT}$ and $V_{HT}$ have no function. If the shock is detected, in order to distinguish between a strong shock and a weak shock, a timing pulse is made to be long for the strong shock or is made to be short for the weak shock. That is, a time constant for the first timing pulse generator 15 is $T_L = R_{122} * C_{123}$ and the other time constant of of the second timing pulse generator 16 is $T_H = R_{131} * C_{132}$. In order to distinguish between $V_{LT}$ and $V_{HT}$, $T_H$ is set to be longer than $T_L$. In other words, if the on-time of LED 142 is long, the input level is $V_{HT}$, while if the on-time of LED 142 is short, the input level is $V_{LT}$, whereby the user can distinguish between $V_{LT}$ and $V_{HT}$, and, in turn, the difference between a weak and strong impact shock. If the output pulses of $V_{LT}$ and $V_{HT}$ are mixed at the same time by the strong shock, and are applied to a transistor, only long signal appears because a short signal of $V_{LT}$ is included in a long signal of $V_{HT}$.

In order to output three signals (respecting "NO SHOCK", "STRONG SHOCK" and "WEAK SHOCK", respectively) on one line-out W3 as serial data, the timing pulses of $V_{LT}$ and $V_{HT}$ are made to be different from each other.

Thus, the transistor 139 is turned on/off according to the period of the pulse series so as to intermittently light the light emitting diode 142 and to drive the alarm (not shown) through the output terminal W3.

What is claimed is:

1. An impact sensing system comprising:

a sensor unit for sensing an impact or acceleration applied;

a envelope detector for detecting an envelope of an output signal of said sensor unit;

an amplifier for amplifying the output signal of said envelope detector, a direct current component being eliminated therefrom;

a first low pass filter for filtering a first level signal from the output signal of said amplifier, said first level signal being indicative of a first level of impact or acceleration;

a second low pass filter for filtering a second level signal from the output signal of said amplifier, said second level signal being indicative of a second level of impact or acceleration;

a first timing pulse generator for generating a first timing pulse with a first time duration in response to the output signal of said first low pass filter, said first time duration being indicative of said first level signal;

a second timing pulse generator for generating a second timing pulse with a second time duration in response to the output of said second low pass filter, said second time duration being indicative of said second level signal;

an alarm drive circuit for driving an external alarm in response to the first timing pulse and the second timing pulse; and a power supply coupled to said envelope detector, said amplifier, said first timing pulse generator, said second timing pulse generator and said alarm drive circuit, for supplying a stable electric power source.

2. An impact sensing system as defined in claim 1, wherein said sensor unit comprises a weight mass suspended by means of projections formed on a printed circuit board with a given space, a coil enclosed in said weight mass with a loop projected out of the upper end of said weight mass, and a ferro-magnetic core inserted onto said loop for generating an electromotive force in said loop by relative motion between them.

3. An impact sensing system as defined in claim 1, wherein:
   said first timing pulse generator includes a first half-wave rectifier with a time constant for providing said first time duration; and
   said second timing pulse generator includes a second rectifier with a time constant for providing said second time duration.

* * * * *